(12) United States Patent
Desai et al.

(10) Patent No.: US 12,500,583 B2
(45) Date of Patent: Dec. 16, 2025

(54) CLOCK INTERPOLATION SYSTEM FOR EYE-CENTERING

(71) Applicant: INTEL CORPORATION, Santa Clara, CA (US)

(72) Inventors: Jayen Desai, Wellington, CO (US); Gerald Pasdast, San Jose, CA (US); Peipei Wang, San Jose, CA (US); Debendra Das Sharma, Saratoga, CA (US)

(73) Assignee: INTEL CORPORATION, Santa Clara, CA (US)

( * ) Notice: Subject to any disclaimer, the term of this patent is extended or adjusted under 35 U.S.C. 154(b) by 588 days.

(21) Appl. No.: 17/889,892

(22) Filed: Aug. 17, 2022

(65) Prior Publication Data

US 2022/0393672 A1  Dec. 8, 2022

Related U.S. Application Data

(60) Provisional application No. 63/348,243, filed on Jun. 2, 2022.

(51) Int. Cl.
*H03K 5/13* (2014.01)
*G06F 1/12* (2006.01)
*H03K 5/00* (2006.01)

(52) U.S. Cl.
CPC ............... *H03K 5/13* (2013.01); *G06F 1/12* (2013.01); *H03K 2005/00013* (2013.01)

(58) Field of Classification Search
CPC ... H03K 5/13; H03K 2005/00013; G06F 1/12
USPC .......................................................... 327/276
See application file for complete search history.

(56) References Cited

U.S. PATENT DOCUMENTS

| | | | | |
|---|---|---|---|---|
| 6,122,336 | A * | 9/2000 | Anderson | H03L 7/0814 375/375 |
| 7,106,117 | B2 * | 9/2006 | Jung | H03K 5/135 327/284 |
| 8,063,686 | B1 * | 11/2011 | Naviasky | H03K 5/135 327/236 |
| 2006/0233291 | A1 * | 10/2006 | Garlepp | H04L 7/0276 375/355 |
| 2016/0056980 | A1 * | 2/2016 | Wang | H04L 25/03057 375/233 |
| 2019/0007054 | A1 * | 1/2019 | Bandi | H03L 7/0814 |
| 2019/0158100 | A1 * | 5/2019 | Lim | H04L 7/044 |
| 2022/0393672 | A1 * | 12/2022 | Desai | G06F 1/12 |
| 2023/0198734 | A1 * | 6/2023 | St. Germain | H03K 5/02 375/375 |
| 2025/0105848 | A1 * | 3/2025 | Choi | H03L 7/0807 |

* cited by examiner

*Primary Examiner* — Ryan Jager
(74) *Attorney, Agent, or Firm* — Schwabe, Williamson & Wyatt, P.C.

(57) ABSTRACT

Embodiments herein relate to a clock interpolation system. The system may be configured to identify, at a change in logical state of a recovered clock signal, a logical state of a first signal when the first signal is delayed by a delay value. The system may be further configured to identify, at a change in logical state of a second signal, a logical state of the clock signal when the clock signal is delayed by the delay value. Based on the two identifications, the delay value and/or a timing of the clock signal may be adjusted. Other embodiments may be described and/or claimed.

20 Claims, 9 Drawing Sheets

CLOCK INTERPOLATION SYSTEM FOR EYE-CENTERING

CROSS-REFERENCE TO RELATED APPLICATION

The present application claims priority to U.S. Provisional Application 63/348,243, filed Jun. 2, 2022, the entire contents of which are herein incorporated by reference.

BACKGROUND

Embodiments of the present disclosure generally relate to the field of a clock interpolation system. In some electronic systems, a clock signal may be transmitted concurrently with, and generally in-phase with, a data signal. The clock signal may then be used at a receiver to recover the data with which the data signal is associated.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments described herein may include apparatus, systems, techniques, or processes that are directed to a clocking system with digital delay controls that may interpolate between two different clock delays corresponding to the left and right edge of a data eye without being sensitive to the integral non-linearity of the delay elements involved in generating the clock delays. The generated clock may be used, for example, for clock recovery of the data in said data eye. In various implementations, such a clock signal may be referred to or used as a "strobe," a "clock used to sample the data," and/or a "target clock strobe for latching data." In other words, the clock signal may be used as a trigger to read the state of a data line.

More generally, a clock signal may be transmitted generally concurrently, and in phase with, a data signal. When the clock/data signals are received, some amount of timing error (which may be referred to as "jitter") may have been introduced during transmission. As a result, the various clock and/or data signals may be received with slight variations to their phase. In order to most accurately retrieve the data that was transmitted using the data signal, it may be desirable to delay the clock signal such that the clock signal changes logical state at the middle of a unit interval (UI) of the data signal. In this way, a change in the logical state (e.g., from a logical low (e.g., a "0") to a logical high (e.g., a "1"), which may be referred to as a "rising edge," or vice-versa, which may be referred to as a "falling edge") may trigger the system to read the state of the data signal to identify whether the intended value is a "0" or a "1."

Figure 1:
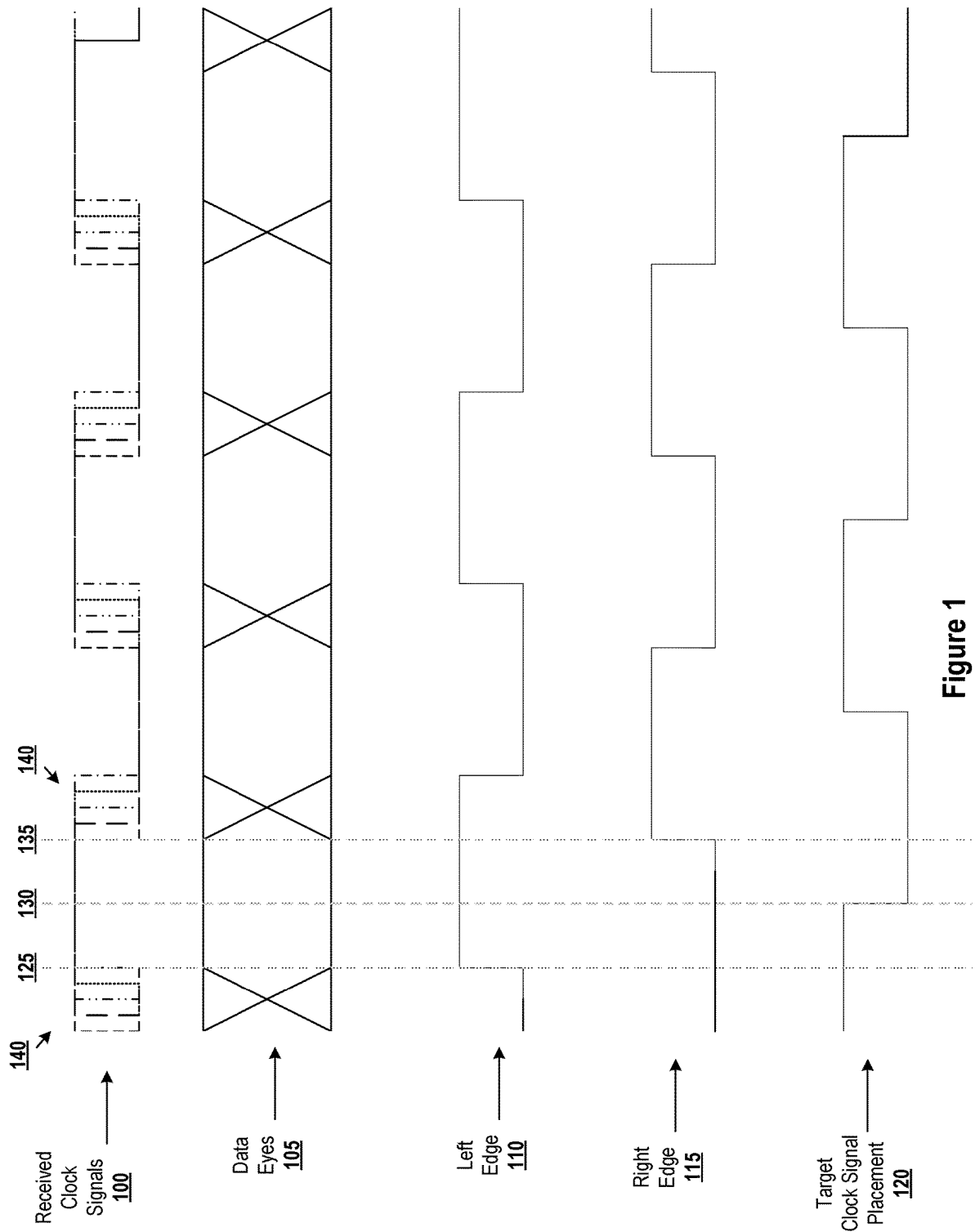
FIG. 1 illustrates an example of various signals or signal elements used herein, in accordance with various embodiments.

FIG. 1 depicts an example of various timing relationships related to a plurality of received clock signals. Specifically, FIG. 1 depicts a plurality of received clock signals at 100. Specifically, at 100, five different clock signals are shown at 140. The different clock signals are indicated by the different dash-line patterns. As noted, it may be assumed that the data signals are generally in phase with the various transmitted clock signals, and so the approximation of the received clock signals at 100 may be viewed as a reasonable approximation of the received data signals.

Based on the received clock signals at 100, one or more data eyes may be generated at 105. Specifically, the data eye 105 may correspond to the received clock signals 100. As shown in FIG. 1, the data eye 105 may correspond to a left-most error-free portion 125 of the received clock signals 100 and a right-most error-free portion 135 of the received clock signals 100.

Based on the data eye(s) at 105, a left edge signal (which may be referred to as QCLK_LEFT_EDGE herein) may be generated at 110. As may be seen, the left edge signal at 110 may have a rising edge that corresponds to the left-most error-free portion 125 of the received clock signals 100, or a left-most portion of the data eye 105. The left edge signal 110 may be one UI long such that the left edge signal 110 changes state at each subsequent left-edge portion 125 of a data eye, as shown in FIG. 1.

A right edge signal (which may be referred to as QCLK_RIGHT_EDGE herein) may also be generated at 115. As may be seen, the right edge signal at 115 may have a rising edge that corresponds to the right-most error-free portion 135 of the received clock signals 100.

As noted above, it may be desirable for the clock signal to be shifted such that a rising or falling edge of the clock signal is placed at the midpoint 130 between the left-most error free portion 125 and the right-most error free portion 135. Such a clock signal may be referred to herein as the "recovered" clock signal or "QCLK." QCLK may be generated by applying an initial delay of 0.5 UI to the received clock signals 100. The application of such a delay may be referred to herein as a "main delay line."

As shown in FIG. 1, the falling edge of the target clock signal at 120 is aligned with the midpoint 130. However, it will be noted that, in the next data eye, the rising edge of the target clock signal at 120 is aligned with the midpoint of a data eye. In this way, if reading the data is triggered by the logical change of the clock signal, and the data signal is generally aligned with the received clock signals 100, it will be recognized that the likelihood of reading a valid value of the data signal is significantly increased.

Legacy techniques to place a recovered clock signal such as that illustrated at 120 may rely on arithmetically manipulating the digital codes corresponding to early and late received clock signals 100, which may introduce an error determined by the integral nonlinearity of the digitally controlled delay lines. Such a timing error may be viewed as a disadvantage of the legacy technique(s). Another such disadvantage may be that managing this error term may impact the design of the delay line, especially in designs which are aggressively pushing voltage lower for optimal power. Embodiments herein may resolve one or more of the above-described disadvantages as well as disadvantages related to a timing budget penalty associated with integral nonlinearity.

Generally, embodiments may relate to a system composed of two subsystems, 1) a main delay (e.g., the delay that is used to place the clock edge in its desired place as described above); and 2) a sensor delay subsystem (e.g., a subsystem that is actively calibrating a monitor delay to a value that is targeted to be at a midpoint between the clock edges). In embodiments, measurement error may be managed by using the same identical copy of the sensor delay used to compare left-edge and right-edge margins by interleaving the comparison.

As a result, embodiments may remove a systematic source of timing error due to delay line integral nonlinearity. Simulation assessments demonstrate timing margins improve by 5-10% of the data eye width.

| Transfer Rate | Eye Width | Timing margin improvement | % eye width improvement |
| --- | --- | --- | --- |
| 16 GT/s | 62.5 ps | 3.2 ps | 5.12% |
| 24 GT/s | 41.67 ps | 3.2 ps | 7.68% |
| 32 GT/s | 31.25 ps | 3.2 ps | 10.24% |

This impacts timing margin directly and can translate into lower power by taking advantage of enhanced margins. Also, by removing the integral non-linearity requirement, embodiments may allow for more flexibility in implementing delay lines with very aggressive low voltage/low power scaling.

Figure 2:
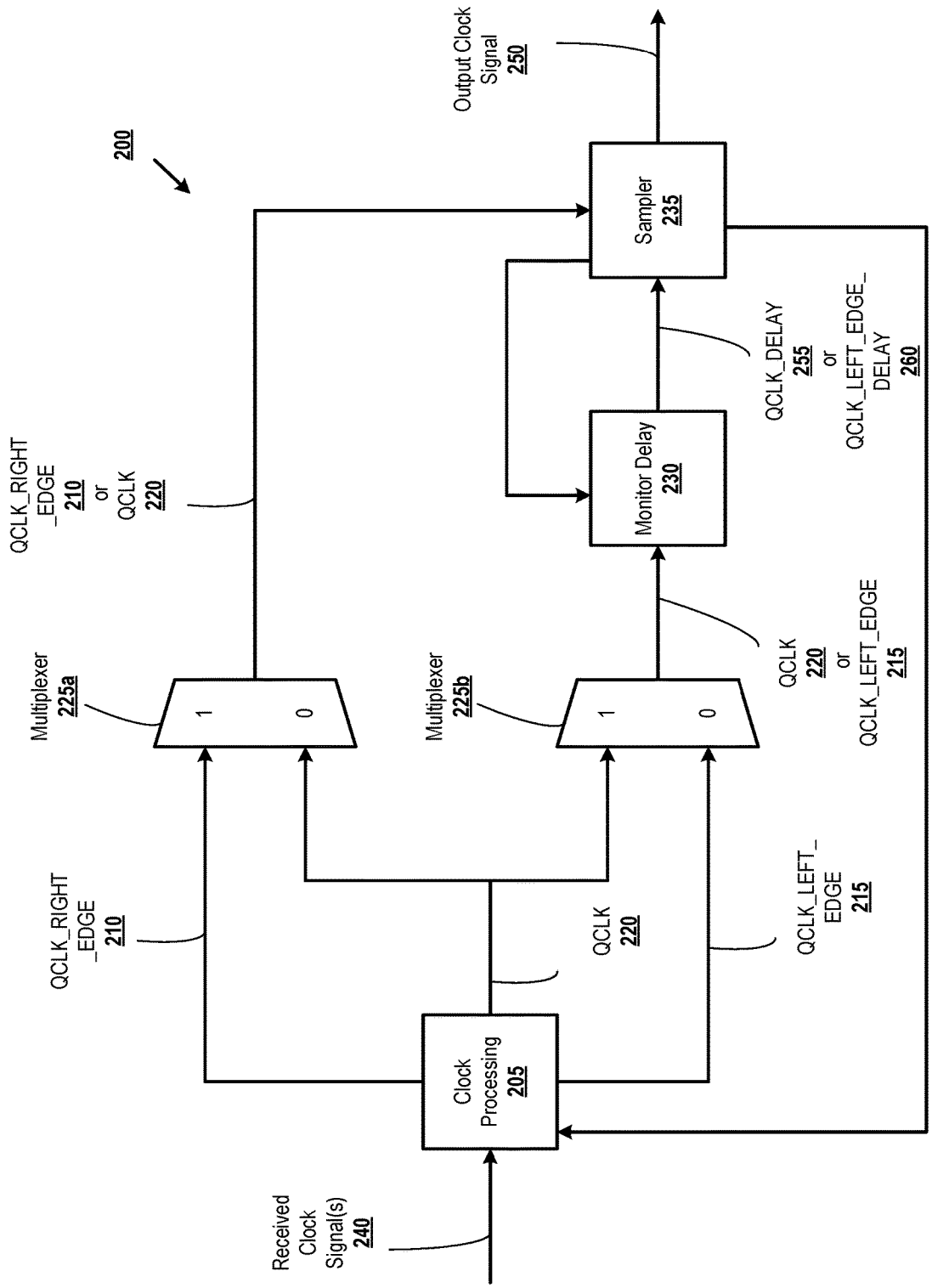
FIG. 2 illustrates an example simplified block diagram of a clock interpolation system, in accordance with various embodiments.

FIG. 2 illustrates an example simplified block diagram of a clock interpolation system 200, in accordance with various embodiments. It will be noted that, in some embodiments, the system 200 may be implemented at a receiver side of a transmit-receive pathway. That is, elements such as the clock processing module 205, multiplexers 225a/225b, monitor delay module 230, and sampler 235 may be implemented at the receiver side of a transmit-receive pathway. Such an embodiment is depicted in FIG. 200 wherein the clock processing module 205 receives received clock signal(s) 240 from, e.g. a transmitter.

In other embodiments, one or more of the elements of the system 200 may be implemented at least partially in the transmitter side of a transmit-receive pathway. For example, the clock processing module 205, one or more of the multiplexers 225a, the monitor delay 230, and/or the sampler 235 may be elements of a transmitter. In this embodiment, the various modules may receive feedback from the receiver, and that feedback is used as the basis for techniques or processes described herein. For example, the receiver may provide timing relation information of the various clock signals to the transmitter, and that timing relation information is used to identify elements such as the data eye(s) 105 and subsequent elements such as the left edge 110, right edge 115, etc. In some embodiments, the clock processing module 205 and the monitor delay 230 may be adjusted as will be described below by the transmitter such that the output clock signal 250 is the clock signal output from the transmitter to the receiver.

For the sake of discussion herein, embodiments will be described with respect to the system 200 being implemented at the receiver. However, it will be recognized that other embodiments may be implemented in the transmitter side as described above.

The system 200 may include a clock processing module 205. The clock processing module 205 may receive one or more clock signal(s) 240, which may generally correspond to the received clock signals discussed with respect to element 100. The clock processing module 205 may be configured to process the received clock signals as discussed with respect to FIG. 1. Specifically, the clock processing module 205 may be configured to identify the data eye(s) discussed with respect to element 105, generate the left edge signal (QCLK_LEFT_EDGE) discussed with respect to element 110, generate the right edge signal (QCLK_RIGHT_EDGE) discussed with respect to element 115, and the recovered clock signal (QCLK) discussed with respect to element 120. The clock processing module 205 may output the QCLK_RIGHT)_EDGE signal 210, the QCLK_LEFT_EDGE signal 215, and the QCLK signal 220. In embodiments, the clock processing module 205 may be implemented as one or more elements of hardware, software, firmware, or some combination thereof.

The QCLK_RIGHT_EDGE signal 210 and the QCLK signal 220 may be output to a first programmable multiplexer 225a. Similarly, the QCLK signal 220 and the QCLK_LEFT_EDGE signal 215 may be output to a second programmable multiplexer 225b. As may be seen in FIG. 2, if multiplexer 225a is set to a value of 1, then the QCLK_RIGHT_EDGE signal 210 is output to sampler 235. Similarly, if the multiplexer 225a is set to a value of 0, then the QCLK signal 220 is output to the sampler 235.

Similarly, if multiplexer 225b is set to a value of 1, then the QCLK signal 220 may be output to a monitor delay module 230. If the multiplexer 225b is set to a value of 0, then the QCLK_LEFT_EDGE signal 215 may be output to the monitor delay module 230. For the sake of discussion herein, setting both multiplexers 225a and 225b to a value of 0 is referred to as "Sample A." Setting both multiplexers 225a and 225b to a value of 1 is referred to as "Sample B."

The monitor delay module 230 may be configured to apply a delay to the signal received from the multiplexer 225b, and then output that signal to the sampler 235. Specifically, if the monitor delay module 230 received the QCLK 220 signal, then the monitor delay module 230 may generate a QCLK_DELAY 255 signal through application of a delay value. Similarly, if the monitor delay module 230 received the QCLK_LEFT_EDGE signal 215, then the monitor delay module 230 may generate and output a QCLK_LEFT_EDGE_DELAY 260 signal. For Sample A and Sample B, the applied delay may be the same. In other words, QCLK_DELAY 255 may be delayed from QCLK 220 by the same amount that QCLK_LEFT_EDGE_DELAY 260 is delayed from QCLK_LEFT_EDGE 215. In some embodiments, the initial monitor delay may be small (e.g., on the order of approximately 0.2 UI, although in other embodiments the initial monitor delay may be larger or smaller such as on the order of approximately 0.1 UI. Generally, the initial monitor delay may be related to or based on factors such as a minimum value that is related to manufacturing tolerances and/or characteristics. In general, the initial monitor delay may be a delay that corresponds to a minimum digital code related to the elements used in the system). Then, through the training process described herein, the monitor delay may be increased. In other embodiments, the initial monitor delay may be larger (e.g., on the order of less than or equal to approximately 2 UI, although in other embodiments the initial monitor delay may be larger or smaller), and then decreased. Specifically, in other embodiments, the initial monitor delay may be initialized to a delay that is larger than the final calibrated value, but smaller than approximately 2 UI and then decreased to its final calibrated value. In other embodiments, the initial monitor delay may be placed somewhere between the above values and then increased or decreased. Generally, as the process iterates as described herein, the final monitor delay may be on the order of approximately 0.4-0.5 UI.

The signals output from multiplexer 225a and the monitor delay module 230 may then be provided to the sampler 235. In general, the sampler may be configured to compare the relative timings of the various received signals as described with respect to FIG. 3-7. In some embodiments, the "sampler" may additionally or alternatively be referred to as a "flop," a "flip-flop," a "latch," or some other term.

More specifically, the sampler 235 may be a module or logic implemented as hardware, software, firmware, etc. that is configured to identify which of two signals first had a logical change. Specifically, when the non-delayed signal has a logical change (e.g., a rising or falling edge), then the sampler 235 may identify such a logical change and sample a value of the delayed signal as described below. Based on the initial state of the delayed signal and the sampled state of the delayed signal, the sampler 235 may be able to identify whether the delayed signal experienced a logical change prior to the logical change of the non-delayed signal. In other words, if the delayed signal is still at its initial logical state, then the sampler 235 may identify that the delayed signal will experience a logical change subsequent to the logical change of the non-delayed signal. Conversely, if the delayed signal is not at its initial logical state, then the sampler 235 may identify that the delayed signal experienced a logical change prior to the logical change of the non-delayed signal. Specific examples are provided below with respect to FIGS. 3-7.

Figure 3:
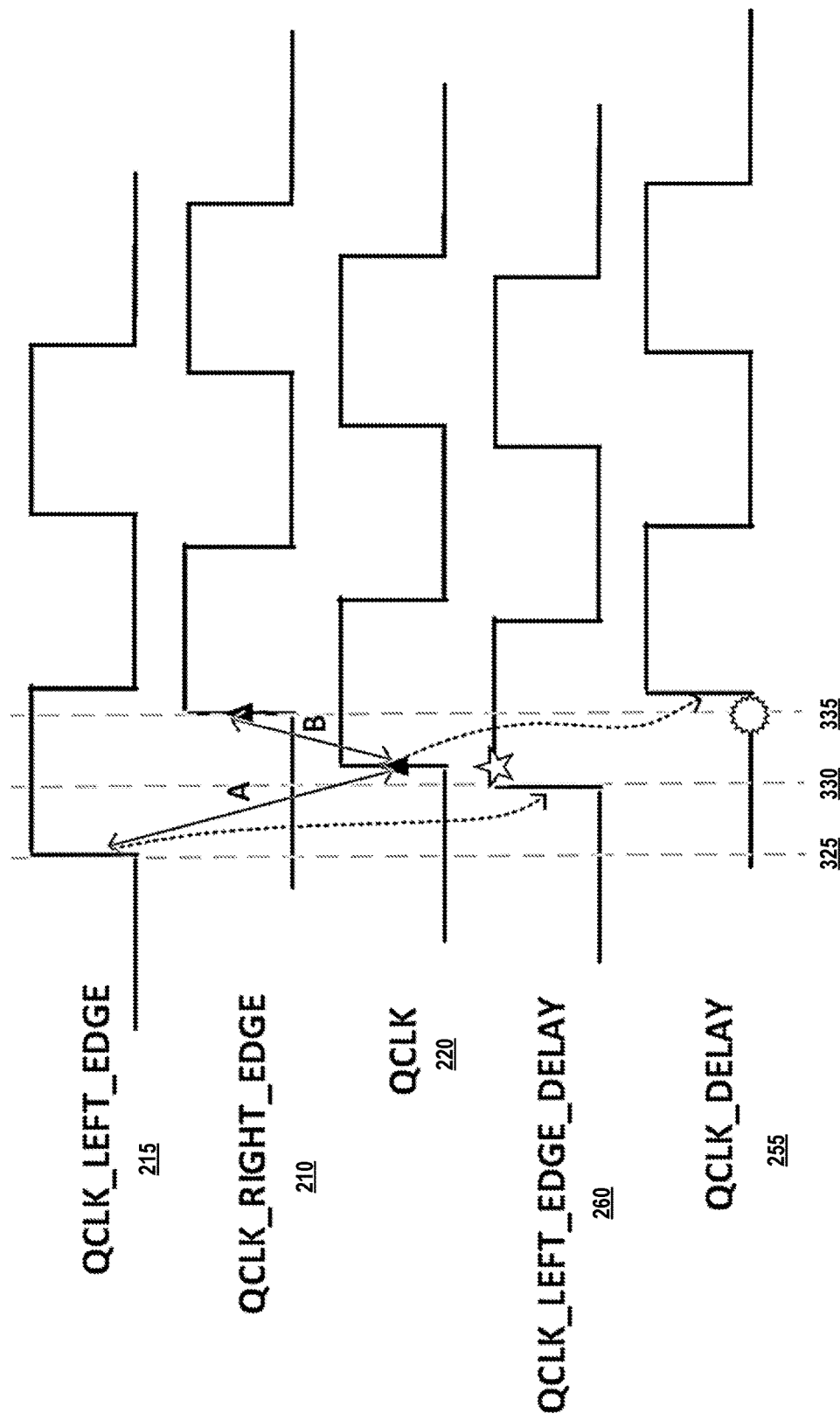
FIG. 3 illustrates a first example timing scenario, in accordance with various embodiments.

Using FIG. 3 as an example, FIG. 3 illustrates a first example timing scenario, in accordance with various embodiments. Specifically, FIG. 3 depicts example relative timing of QCLK_LEFT_EDGE 215, QCLK_RIGHT_EDGE 210, QCLK_220, QCLK_LEFT_EDGE_DELAY 260, and QCLK_DELAY 255. Line 325 depicts a rising edge of QCLK_LEFT_EDGE 215, which may correspond to line 125 of FIG. 1. Similarly, line 335 depicts a rising edge of QCLK_RIGHT_EDGE 210, which may correspond to line 135 of FIG. 1. Line 330 may correspond to a midpoint between lines 325 and 335. As noted, it may be preferable for the combination of the main delay enacted by the clock processing module 205 and the monitor delay of the monitor delay module 230 to place the rising edge of QCLK220 at the midpoint 330. As may be seen in FIG. 3, the rising edge of QCLK 220 may be between lines 330 and 335.

As described previously, the sampler may compare two values of Sample A (which includes QCLK 220 and QCLK_LEFT_EDGE_DELAY 260) and two values of Sample B (which includes QCLK_RIGHT_EDGE 210 and QCLK_DELAY 255) to one another. More specifically, the sampler may identify the value of the signal received from the monitor delay module 230 at the time of the rising edge of the signal received from multiplexer 225a.

In this example, at Sample A, the sampler 235 may identify the value of QCLK_LEFT_EDGE_DELAY 260, received from the monitor delay module 230, at a rising edge of QCLK 220, received from multiplexer 225a. As shown in FIG. 3, and as indicated by the star-shaped indicator on the QCLK_LEFT_EDGE_DELAY 260 signal, that value may be "high" or a logical "1."

Similarly, at Sample B, the sampler 235 may identify the value of QCLK_DELAY 255, received from the monitor delay module 230, at a rising edge of QCLK_RIGHT_EDGE 210, received from multiplexer 225a. As shown in FIG. 3, and as indicated by the gear-like indicator on the QCLK_DELAY 255 signal, that value may be "low" or a logical "0."

Based on the identification that samples A and B output respective values of 1 and 0, the sampler 235 may identify that the QCLK signal 220 is "late." That is, the rising edge of QCLK 220 is beyond the midpoint 330. In this situation, the sampler 235 may be configured to provide feedback to the clock processing module 205 to reduce the main delay that is applied to the received clock signal(s) 240.

It will be noted that, in some embodiments related to this example and others of the examples illustrated in FIGS. 3-7, the sampler 235 may include logic that is configured to identify the correction to be made in the event of a certain outcome of samples A and B, and provide instructions to the clock processing module 205. For example, the instructions may instruct the clock processing module 205 to reduce the main delay by some absolute value (e.g., some number of picoseconds or nanoseconds), or to reduce the main delay by some relational value (e.g., by a percentage, or by some percentage of a UI such as 0.5 UI, 0.1 UI, etc.). In some embodiments, the sampler 235 may not include such logic, and instead may only output the values of samples A and B to the clock processing module 205, which may include the logic to identify the correction to be made (such as the corrections described above). In some embodiments, additional logic may be positioned in the communication pathway between the sampler 235 and the clock processing module 205, and configured to receive the values of samples A/B from the sampler 235, identify the correction to be made, and provide instructions related to such correction to the clock processing module 205. Generally, the specific form of the instructions or the placement of such logic may be based on specific implementations or use cases. In some embodiments, the specific values used for the absolute values or the proportional values may be pre-defined, or may be based on one or more dynamic factors (e.g., the number of times the same values occur for repeated sets of samples).

Figure 4:
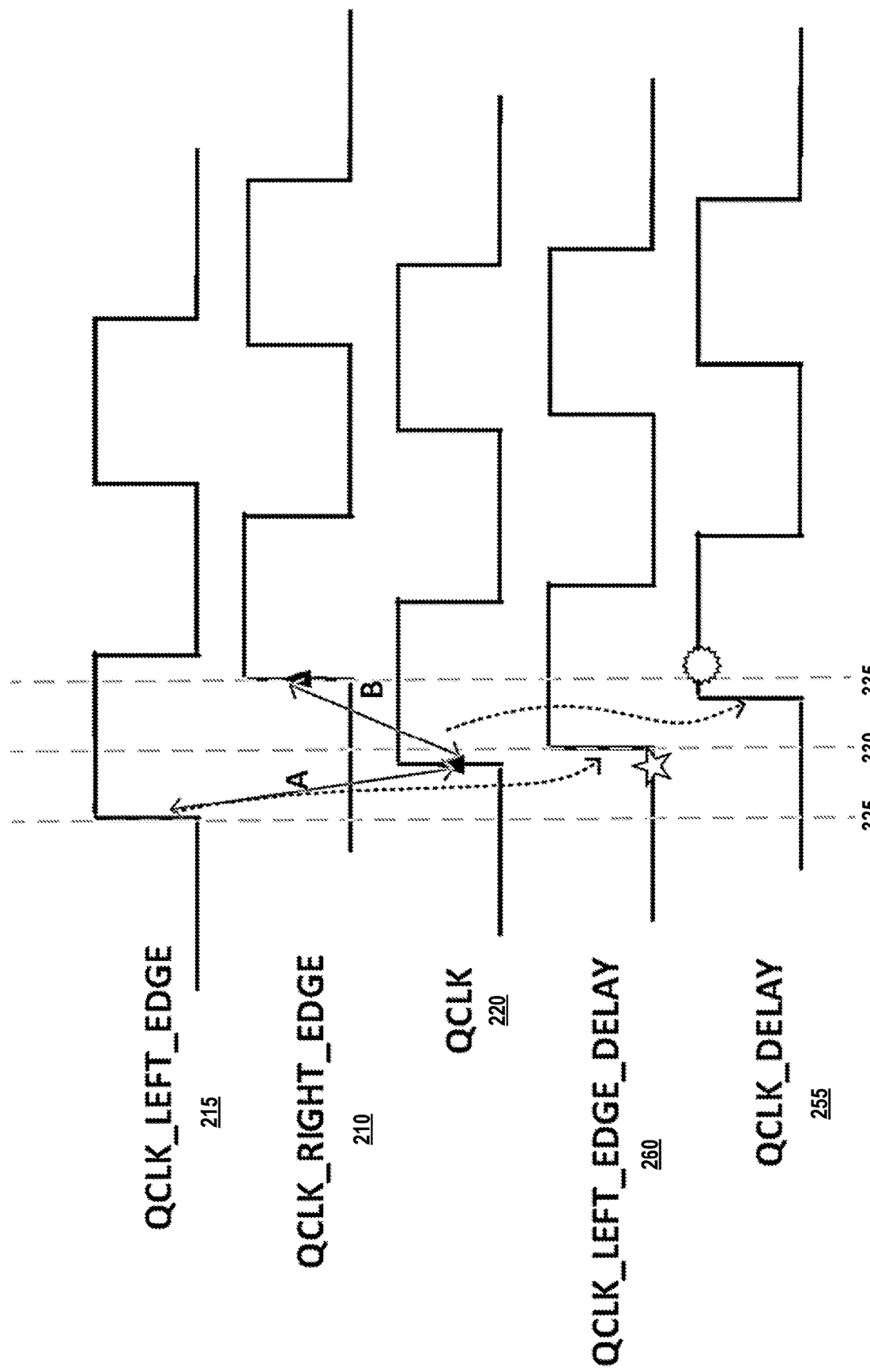
FIG. 4 illustrates a second example timing scenario, in accordance with various embodiments.

FIG. 4 illustrates a second example timing scenario, in accordance with various embodiments.

In this example, at Sample A, the sampler 235 may identify the value of QCLK_LEFT_EDGE_DELAY 260, received from the monitor delay module 230, at a rising edge of QCLK 220, received from multiplexer 225a. As shown in FIG. 4, and as indicated by the star-shaped indicator on the QCLK_LEFT_EDGE_DELAY 260 signal, that value may be "low" or a logical "0."

Similarly, at Sample B, the sampler 235 may identify the value of QCLK_DELAY 255, received from the monitor delay module 230, at a rising edge of QCLK_RIGHT_EDGE 210, received from multiplexer 225a. As shown in FIG. 4, and as indicated by the gear-like indicator on the QCLK_DELAY 255 signal, that value may be "high" or a logical "1."

Based on the identification that samples A and B output respective values of 0 and 1, the sampler 235 may identify that the QCLK signal 220 is "early." That is, the rising edge of QCLK 220 is prior to the midpoint 330, as shown in FIG. 4. In this situation, the sampler 235 may be configured to provide feedback to the clock processing module 205 to increase the main delay that is applied to the received clock signal(s) 240. Such an increase may be based on an absolute value or a relational value as described above.

Figure 5:
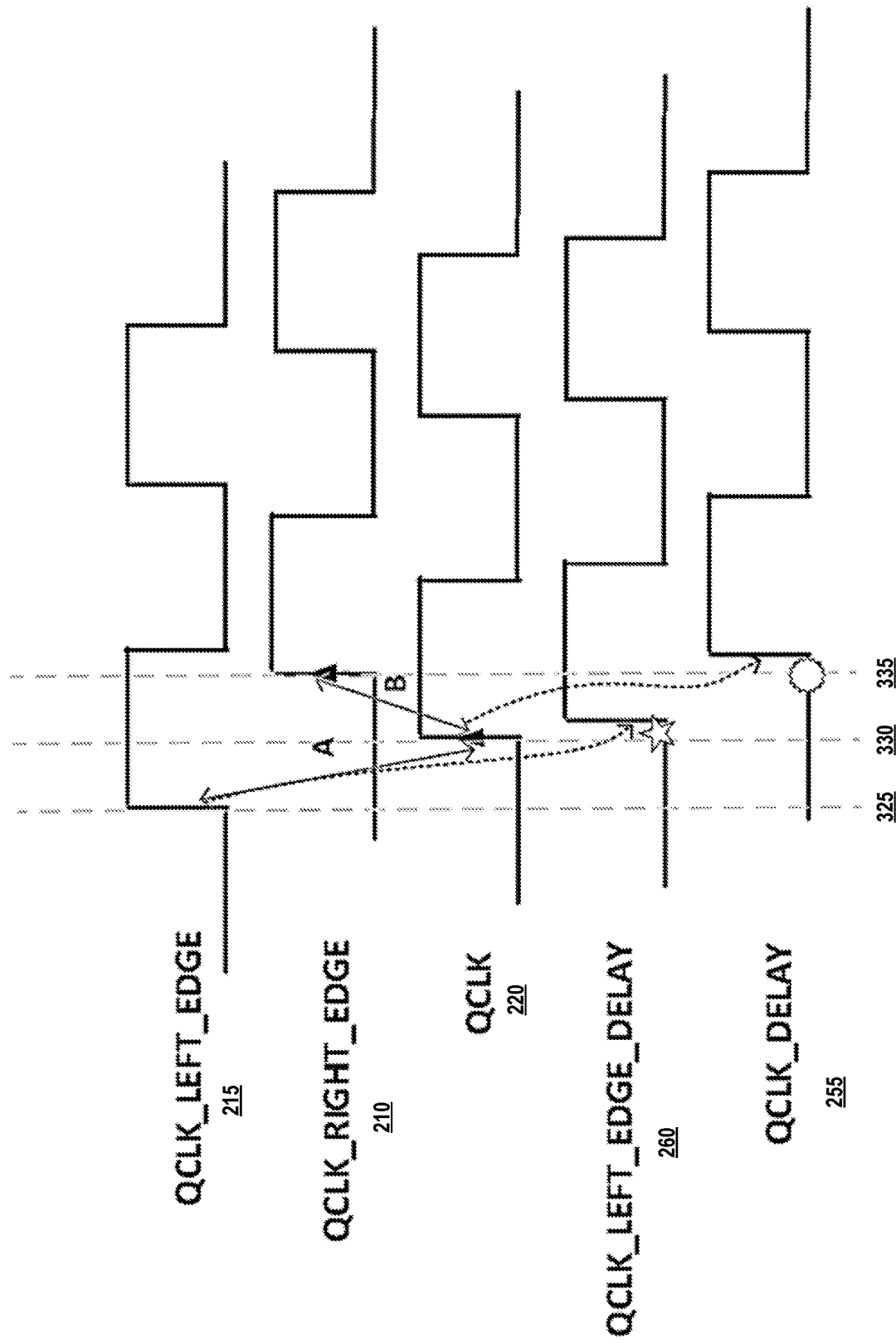
FIG. 5 illustrates a third example timing scenario, in accordance with various embodiments.

FIG. 5 illustrates a third example timing scenario, in accordance with various embodiments.

In this example, at Sample A, the sampler 235 may identify the value of QCLK_LEFT_EDGE_DELAY 260, received from the monitor delay module 230, at a rising edge of QCLK 220, received from multiplexer 225a. As shown in FIG. 5, and as indicated by the star-shaped indicator on the QCLK_LEFT_EDGE_DELAY 260 signal, that value may be "low" or a logical "0."

Similarly, at Sample B, the sampler 235 may identify the value of QCLK_DELAY 255, received from the monitor delay module 230, at a rising edge of QCLK_RIGHT_EDGE 210, received from multiplexer 225a. As shown in FIG. 5, and as indicated by the gear-like indicator on the QCLK_DELAY 255 signal, that value may be "low" or a logical "0."

Based on the identification that samples A and B output respective values of 0 and 0, the sampler 235 may identify that the monitor delay provided by the monitor delay module 230 is too large. In this situation, the sampler 235 may be configured to provide feedback to the monitor delay module 230 to decrease the monitor delay that is applied to the signals output from multiplexer 225b. Such feedback may be provided and processed in a manner similar to that described above with respect to the feedback provided to the clock processing module 205. That is, in some embodiments the sampler may 235 include some form of logic, the monitor delay module 230 may include some form of logic, or a logic module may be placed in the communication path between the sampler 235 and the monitor delay module 230. Such a decrease to the monitor delay applied by the monitor delay module 230 may be based on an absolute value or a relational value as described above.

Figure 6:
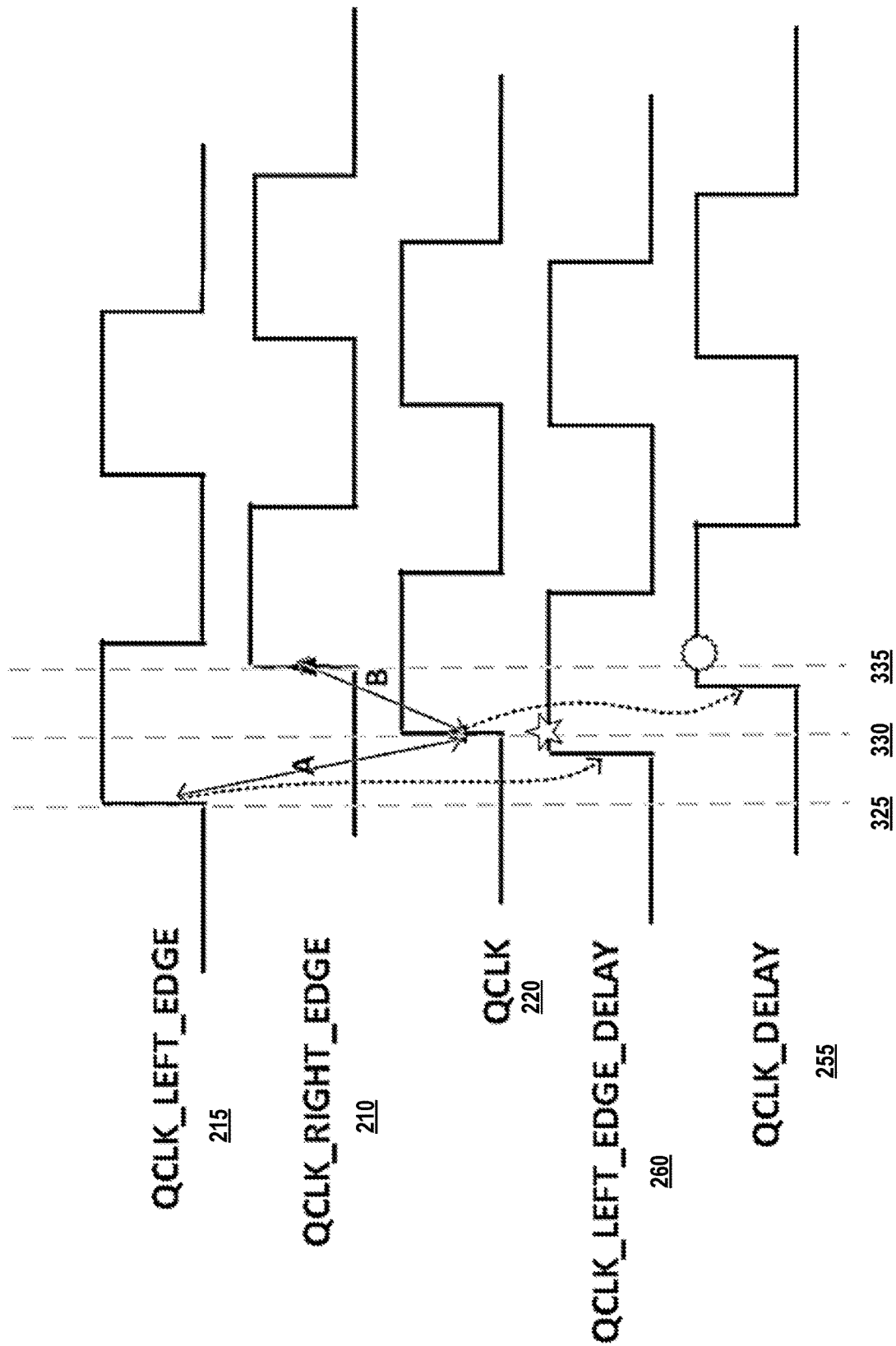
FIG. 6 illustrates a fourth example timing scenario, in accordance with various embodiments.

FIG. 6 illustrates a fourth example timing scenario, in accordance with various embodiments.

In this example, at Sample A, the sampler 235 may identify the value of QCLK_LEFT_EDGE_DELAY 260, received from the monitor delay module 230, at a rising edge of QCLK 220, received from multiplexer 225a. As shown in FIG. 6, and as indicated by the star-shaped indicator on the QCLK_LEFT_EDGE_DELAY 260 signal, that value may be "high" or a logical "1."

Similarly, at Sample B, the sampler 235 may identify the value of QCLK_DELAY 255, received from the monitor delay module 230, at a rising edge of QCLK_RIGHT_EDGE 210, received from multiplexer 225a. As shown in FIG. 5, and as indicated by the gear-like indicator on the QCLK_DELAY 255 signal, that value may be "high" or a logical "1."

Based on the identification that samples A and B output respective values of 1 and 1, the sampler 235 may identify that the monitor delay provided by the monitor delay module 230 is too small. In this situation, the sampler 235 may be configured to provide feedback to the monitor delay module 230 to increase the monitor delay that is applied to the signals output from multiplexer 225b. Such an increase to the monitor delay applied by the monitor delay module 230 may be based on an absolute value or a relational value as described above.

In some embodiments, the system may not respond to each A and B sample; instead, the system may respond to the average value of the A and B samples over a window that groups several consecutive A/B sample pairs. In this case, the system may take the actions described above with respect to FIGS. 3-7 in response to the averaged value of the A/B samples.

As a concrete example with a window size of N: the system will provide a correction to the monitor delay or the main delay if at least N/2 A/B sample pairs require this action. In other embodiments, the system may take such a corrective action based on some other mathematical operation such as a mean. This type of sample filtering may be useful to avoid excessive responsiveness to noise.

In embodiments, the above described process of adjusting the main delay provided by the clock processing module 205 or the monitor delay provided by the monitor delay 230 module may iterate until the process has achieved quiescence. Specifically, the above-described process may iterate until it is identified that the rate of change has slowed to a state that is viewed as being aligned with a pre-identified criteria. As a concrete example, the above-described process may iterate until a logic (not shown in FIG. 2) identifies that the monitor delay and/or main delay have not been adjusted for a pre-identified number of sensor loops or cycles (e.g., 10 cycles, 20 cycles, etc). At this point, the logic may identify that the system has reached quiescence and the process may end.

In some embodiments, this process may be performed during a training period such as may happen during an initial boot-up sequence, an initial power-on sequence, or some other initial sequence of an electronic device. At this time, the sampler 235 may provide an output clock signal 250 which may be used to read data received on a data line (not shown in FIG. 2). Specifically, and as previously described, the value of the signal on the data line may be read at each logical change (e.g., rising edge or falling edge) of the output clock signal 250.

In some embodiments, this process may be performed outside of a training sequence. For example, in some embodiments the iterative process of identifying a main delay and a monitor delay may occur based on a number of data read errors (e.g., if the number of data read errors exceeds a threshold value over a given time, or some other type of threshold analysis). In some embodiments, the process may be performed periodically (e.g., every X cycles). Other embodiments may repeat the process based on other factors.

Figure 7:
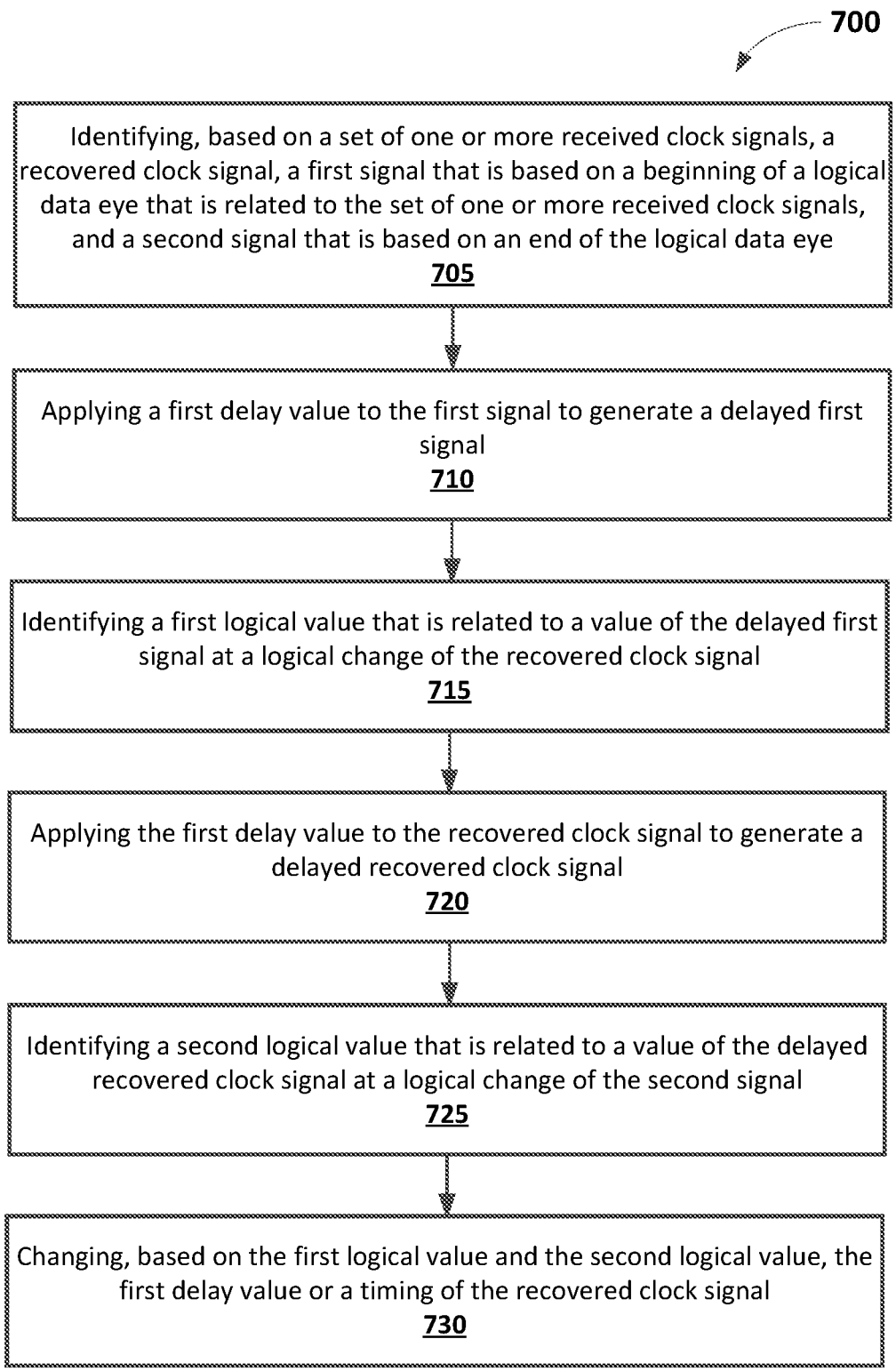
FIG. 7 illustrates an example technique related to a clock interpolation system, in accordance with various embodiments.

FIG. 7 illustrates an example technique 700 related to a clock interpolation system, in accordance with various embodiments. For example, the technique 700 may be performed, in whole or in part, by a system such as system 200.

The technique 700 may include identifying, at 705 based on a set of one or more received clock signals, a recovered clock signal, a first signal that is based on a beginning of a logical data eye that is related to the set of one or more received clock signals, and a second signal that is based on an end of the logical data eye. In embodiments, element 705 may be performed, in whole or in part, by the clock processing module 205. The set of one or more received clock signals may be similar to the clock signals referred to with respect to elements 140 or 240. The recovered clock signal may be similar to, for example, QCLK 220. The first signal may be, for example, QCLK_LEFT_EDGE 215, which may be based on the data eye as described with respect to elements 105 and 110. The second signal may be, for example, QCLK_RIGHT_EDGE 210, which may be based on the data eye as described with respect to elements 105 and 115.

The technique 700 may further include applying, at 710, a first delay value to the first signal to generate a delayed first signal. The element 710 may be performed, in whole or in part, by the monitor delay 230 as previously described. The delayed first signal may be, for example, QCLK_LEFT_EDGE_DELAY 260 as described above.

The technique 700 may further include identifying, at 715, a first logical value that is related to a value of the delayed first signal at a logical change of the recovered clock signal. For example, the logical value may be the logical "0" or "1" that represents the value of the QCLK_LEFT_EDGE_DELAY 260 at the logical change (e.g., the rising or falling edge) of QCLK 220, as described with respect to FIGS. 3-6. In embodiments, element 715 may be performed, for example, by sampler 235.

The technique 700 may further include applying, at 720, the first delay value to the recovered clock signal to generate a delayed recovered clock signal. Element 720 may be performed, in whole or in part, by the monitor delay 230 as previously described. The delayed recovered clock signal may be, for example QCLK_DELAY 255 as described above.

The technique 700 may further include identifying, at 725, a second logical value that is related to a value of the delayed recovered clock signal at a logical change of the second signal. For example, the logical value may be the logical "0" or "1" that represents the value of QCLK_DELAY 255 at the logical change (e.g., the rising or falling edge) of QCLK_RIGHT_EDGE 210, as described with respect to FIGS. 3-6. In embodiments, element 715 may be performed, for example, by sampler 235.

The technique 700 may further include changing, at 730 based on the first logical value and the second logical value, the first delay value or a timing of the recovered clock signal. For example, as noted the sampler 235 may change (or facilitate the change of) the delay value provided by the monitor delay 230. Additionally or alternatively, the sampler 235 may change (or facilitate the change of) the delay value applied by the clock processing module 205 to generate QCLK 220 based on one or more of the received clock signal(s) 240.

It will be noted that the above-described technique is intended as one example technique, and other embodiments may vary. For example, other techniques may have more or fewer elements, elements arranged in a different order, etc. In some embodiments, one or more additional/alternative elements of a system such as system 200 may perform at least a part of one of the described elements of technique 700. It will also be noted that the specific names of the various signals provided herein (e.g., QCLK, QCLK_LEFT_EDGE, QCLK_RIGHT_EDGE, QCLK_DELAY, QCLK_LEFT_EDGE_DELAY, etc.) are intended for the sake of discussion and description, and are not intended to be limiting as to the specific names that may be used in implementations of embodiments of the present disclosure.

Figure 8:
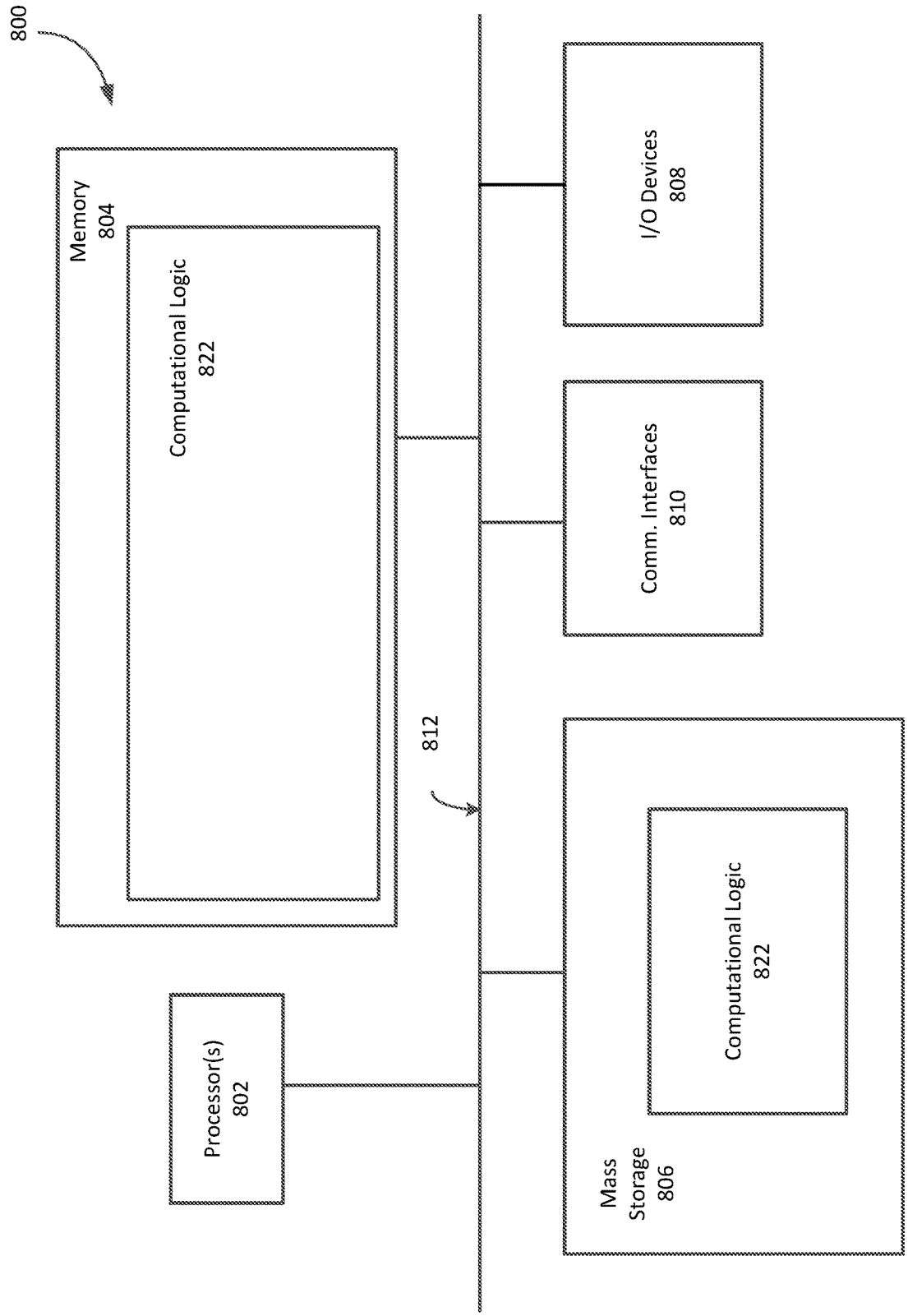
FIG. 8 illustrates an example computing system suitable for practicing various aspects of the disclosure, in accordance with various embodiments.

FIG. 8 illustrates an example computing device 800 suitable for use to practice aspects of the present disclosure, in accordance with various embodiments. The example computing device 800 may be suitable to implement the functionalities associated with one or more of FIGS. 1-7 and/or some other process, method, and/or technique described herein, in whole or in part. Specifically, the computing device 800 may include or implement one or more elements of the clock interpolation system 200, as described above. For example, the computing device 800, and particularly one or more of the computational logic 522, communication interfaces 510, and/or I/O devices 508 may include or implement elements of the system 200 such as the clock processing module 205, the multiplexers 225a/225b, the monitor delay module 230, the sample 235, or some other element of the system 200.

As shown, computing device 800 may include one or more processors 802, each having one or more processor cores, and system memory 804. The processor 802 may include any type of unicore or multi-core processors. Each processor core may include a central processing unit (CPU), and one or more level of caches. The processor 802 may be implemented as an integrated circuit. One or more of the processors 802 may include, or be coupled with, a clock subsystem such as that described herein.

The computing device 800 may include mass storage devices 806 (such as diskette, hard drive, volatile memory (e.g., dynamic random access memory (DRAM)), compact disc read only memory (CD-ROM), digital versatile disk (DVD) and so forth). In general, system memory 804 and/or mass storage devices 806 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 800 may further include input/output (I/O) devices 808 such as a display, keyboard, cursor control, remote control, gaming controller, image capture device, one or more three-dimensional cameras used to capture images, and so forth, and communication interfaces 810 (such as network interface cards, modems, infrared receivers, radio receivers (e.g., Bluetooth), and so forth). I/O devices 808 may be suitable for communicative connections with three-dimensional cameras or user devices. In some embodiments, I/O devices 808 when used as user devices may include a device necessary for implementing the functionalities of receiving an image captured by a camera.

The communication interfaces 810 may include communication chips (not shown) that may be configured to operate the device 800 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 810 may operate in accordance with other wireless protocols in other embodiments.

The above-described computing device 800 elements may be coupled to each other via system bus 812, which may represent one or more buses. In the case of multiple buses, they may be bridged by one or more bus bridges (not shown). Each of these elements may perform its conventional functions known in the art. In particular, system memory 804 and mass storage devices 806 may be employed to store a working copy and a permanent copy of the programming instructions implementing the operations and functionalities associated with any of FIGS. 1-7 and/or some other method, process, or technique described herein, in whole or in part, generally shown as computational logic 822. Computational logic 822 may be implemented by assembler instructions supported by processor(s) 802 or high-level languages that may be compiled into such instructions.

The permanent copy of the programming instructions may be placed into mass storage devices 806 in the factory, or in the field, though, for example, a distribution medium (not shown), such as a compact disc (CD), or through communication interfaces 810 (from a distribution server (not shown)).

Figure 9:
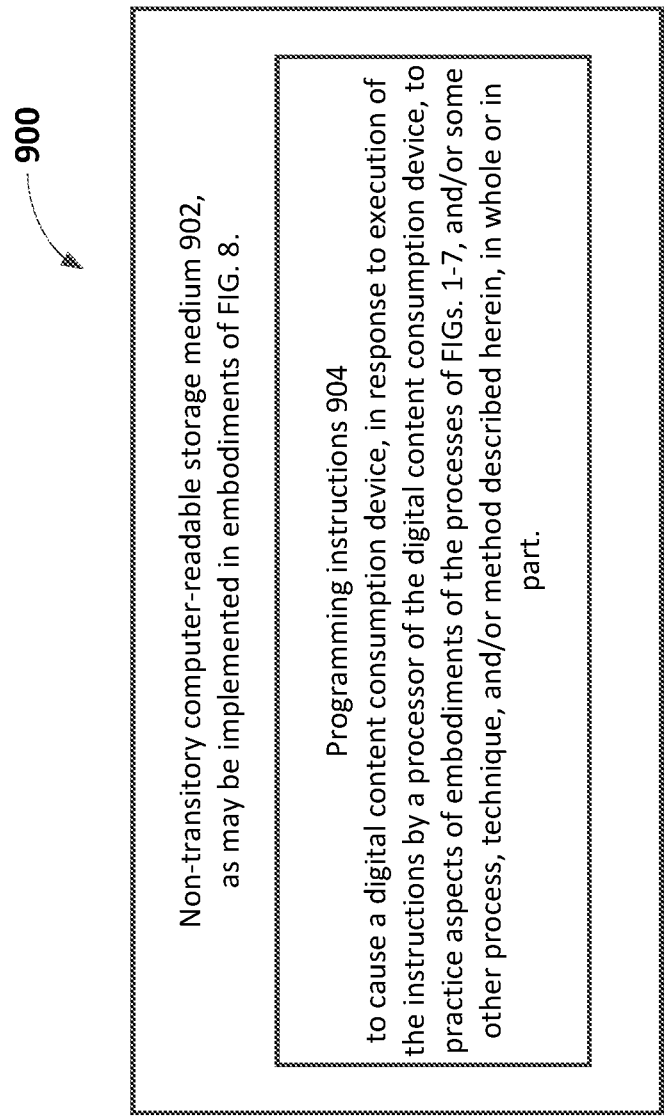
FIG. 9 illustrates an example non-transitory computer-readable storage medium having instructions configured to practice all or selected ones of the operations associated with the processes described in reference to FIGS. 1-9, and/or some other process, technique, and/or method described herein, in whole or in part.

FIG. 9 illustrates an example non-transitory computer-readable storage media 902 having instructions configured to practice all or selected ones of the operations associated with the processes described above. As illustrated, non-transitory computer-readable storage medium 902 may include a number of programming instructions 904. Programming instructions 904 may be configured to enable a device, e.g., computing device 800, in response to execution of the programming instructions, to perform one or more operations of the processes described in reference to any of FIGS. 1-7 and/or some other method, process, or technique described herein, in whole or in part. For example, the programming instructions 904 may at least partially control one or more elements of the computing device 800 and/or the system 200. In alternate embodiments, programming instructions 904 may be disposed on multiple non-transitory computer-readable storage media 902 instead. In still other embodiments, programming instructions 904 may be encoded in transitory computer-readable signals.

In the preceding description, various aspects of the illustrative implementations were described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the preceding detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

EXAMPLES

Example 1 includes a method to be performed by a clock subsystem of a computing device, one or more elements of such a subsystem, and/or one or more electronic devices that implement or include one or more elements of such a subsystem, wherein the method comprises: identifying, based on a delay line, a left edge of a signal related to a clock signal; identifying, based on the delay line, a right edge of a signal related to the clock signal; and altering the clock signal such that an edge of the clock signal is at an approximate midpoint between the left edge and the right edge.

Example 2 includes the method of example 1, and/or some other example herein, wherein the clock signal is a signal on a QCLK line.

Example 3 includes the method of any of examples 1-2, and/or some other example herein, wherein the left edge is identified based on a signal on a CLK_LEFT_EDGE line.

Example 4 includes the method of example 3, wherein the CLK_LEFT_EDGE is related to a training process of the clock.

Example 5 includes the method of any of examples 1-4, and/or some other example herein, wherein the right edge is identified based on a signal on a CLK_RIGHT_EDGE.

Example 6 includes the method of example 5, wherein the CLK_RIGHT_EDGE is related to a training process of the clock.

Example 7 includes the method of any of examples 1-6, and/or some other example herein, wherein the subsystem is to alter the clock signal by adjusting a signal of a sensor delay line.

Example 8 includes the method of example 7, and/or some other example herein, wherein the sensor delay line is a QCLK_DELAY line.

Example 9 includes the method of any of examples 1-8, and/or some other example herein, wherein the clock subsystem is or includes a quadrature lock sensor (QLS).

Example 10 includes the method of any of examples 1-9, and/or some other example herein, further comprising: multiplexing the signal on the QCLK line, the signal on the CLK_LEFT_EDGE line, and the signal on the CLK_RIGHT_EDGE line; and outputting the resultant multiplexed signal as a QCLK_OUT signal and/or a signal on a QCLK_OUT line.

Example 11 includes the method of any of examples 1-10, and/or some other example herein, wherein the altering is based on an average of a plurality of values related to the left edge of the signal and/or an average of a plurality of values related to the right edge of the signal.

Example 12 includes a method to be performed by an electronic device, wherein the method comprises: identifying, based on a set of one or more received clock signals, a recovered clock signal, a first signal that is based on a beginning of a logical data eye that is related to the set of one or more received clock signals, and a second signal that is based on an end of the logical data eye; applying a first delay value to the first signal to generate a delayed first signal; identifying a first logical value that is related to a value of the delayed first signal at a logical change of the recovered clock signal; and applying the first delay value to the recovered clock signal to generate a delayed recovered clock signal; identifying a second logical value that is related to a value of the delayed recovered clock signal at a logical change of the second signal; and changing, based on the first logical value and the second logical value, the first delay value or a timing of the recovered clock signal.

Example 13 includes the method of example 12, and/or some other example herein, wherein the recovered clock signal is based on application of a second delay to a clock signal of the set of one or more received clock signals.

Example 14 includes the method of example 13, and/or some other example herein, wherein changing the timing of the recovered clock signal includes changing a value of the second delay.

Example 15 includes the method of example 14, and/or some other example herein, wherein if the first logical value is "0" and the second logical value is "1," then changing the timing of the recovered clock signal includes increasing the value of the second delay.

Example 16 includes the method of any of examples example 14 or 15, and/or some other example herein, wherein if the first logical value is "0" and the second logical value is "1," then changing the timing of the recovered clock signal includes decreasing the value of the second delay.

Example 17 includes the method of any of examples 12-16, and/or some other example herein, wherein the logical change of the recovered clock signal is a rising edge of the recovered clock signal.

Example 18 includes the method of any of examples 12-16, and/or some other example herein, wherein the logical change of the second signal is a rising edge of the second signal.

Example 19 includes the method of any of examples 12-18, and/or some other example herein, wherein the first signal is related to an earliest error-free value of the set of one or more received clock signals.

Example 20 includes the method of any of examples 12-19, and/or some other example herein, wherein the second signal is related to a latest error-free value of the set of one or more received clock signals.

Example 21 includes the method of any of examples 12-20, and/or some other example herein, wherein the recovered clock signal is a QCLK signal.

Example 22 includes the method of any of examples 12-21, and/or some other example herein, wherein the first signal is a QCLK_LEFT_EDGE signal.

Example 23 includes the method of any of examples 12-22, and/or some other example herein, wherein the second signal is a QCLK_RIGHT_EDGE signal.

Example 24 includes the method of any of examples 12-23, and/or some other example herein, wherein if the first logical value is "1" and the second logical value is "1," then the first delay value is increased.

Example 25 includes the method of any of examples 12-24, and/or some other example herein, wherein if the first logical value is "0" and the second logical value is "0," then the first delay value is decreased.

Example 26 includes the method of any of examples 12-25, and/or some other example herein, further comprising: selecting an output of a first multiplexer, wherein the first multiplexer accepts as input the recovered clock signal and the first signal, and outputs the recovered clock signal or the first signal based on a setting of the first multiplexer; and selecting an output of a second multiplexer, wherein the second multiplexer accepts as input the recovered clock signal and the second signal, and outputs the recovered clock signal or the second signal based on a setting of the second multiplexer.

Example 27 includes the method of example 26, and/or some other example herein, wherein the first multiplexer outputs the recovered clock signal or the first signal to a delay module that applies the first delay to the recovered clock signal or the first signal.

Example Z01 may include an apparatus comprising means to perform one or more elements of a method described in or related to any of examples herein, or any other method or process described herein.

Example Z02 may include an apparatus comprising logic, modules, or circuitry to perform one or more elements of a method described in or related to any of examples herein, or any other method or process described herein.

Example Z03 may include a method, technique, or process as described in or related to any of examples herein, or portions or parts thereof.

Example Z04 may include a signal as described in or related to any of examples herein, or portions or parts thereof.

What is claimed is:
1. A clock interpolation system comprising:
a clock processing module to generate, based on one or more received clock signals, a recovered clock signal, a first signal related to a left edge of the recovered clock signal, and a second signal related to a right edge of the recovered clock signal;

a monitor delay module to:
  apply a first delay to a recovered clock signal to generate a delayed recovered clock signal; and
  apply the first delay to the first signal to generate a delayed first signal; and
a sampler to:
  identify a first logical value related to a logical state of the delayed first signal at a logical change of the recovered clock signal;
  identify a second logical value related to a logical state of the delayed clock signal at a logical change of the second signal; and
  facilitate, based on the identified first and second logical values, a change to a value of the first delay.

2. The clock interpolation system of claim 1, wherein the clock processing module is to generate the recovered clock signal based on application of a second delay to a clock signal of the one or more received clock signals.

3. The clock interpolation system of claim 2, wherein the sampler is further to facilitate a change to the recovered clock signal based on a change in a value of the second delay.

4. The clock interpolation system of claim 3, wherein if the first logical value is "0" and the second logical value is "1," then the change in the second delay includes increasing the second delay.

5. The clock interpolation system of claim 3, wherein if the first logical value is "0" and the second logical value is "1," then the change in the second delay includes decreasing the second delay.

6. The clock interpolation system of claim 1, wherein the logical change of the recovered clock signal is a rising edge of the recovered clock signal.

7. The clock interpolation system of claim 1, wherein the logical change of the second signal is a rising edge of the second signal.

8. The clock interpolation system of claim 1, further comprising a multiplexer to:
  receive, from the clock processing module, the recovered clock signal and the second signal; and
  selectively output one of the recovered clock signal and the second signal to the sampler.

9. The clock interpolation system of claim 1, further comprising a multiplexer to:
  receive, from the clock processing module, the recovered clock signal and the first signal; and
  selectively output one of the recovered clock signal and the second signal to the monitor delay module.

10. An electronic device comprising:
  transmit circuitry to transmit a set of one or more clock signals and one or more data signals;
  receive circuitry to identify a set of one or more received clock signals and one or more received data signals; and
  a clock interpolation system to:
    identify, based on the set of one or more received clock signals, a recovered clock signal, a first signal that is based on a beginning of a logical data eye that is related to the set of one or more received clock signals, and a second signal that is based on an end of the logical data eye;
    apply a first delay value to the first signal to generate a delayed first signal;
    identify a first logical value that is related to a value of the delayed first signal at a logical change of the recovered clock signal;
    apply the first delay value to the recovered clock signal to generate a delayed recovered clock signal;
    identify a second logical value that is related to a value of the delayed recovered clock signal at a logical change of the second signal; and
    change, based on the first logical value and the second logical value, the first delay value or a timing of the recovered clock signal.

11. The electronic device of claim 10, wherein the clock interpolation system is an element of the transmit circuitry.

12. The electronic device of claim 10, wherein the clock interpolation system is an element of the receive circuitry.

13. The electronic device of claim 10, wherein the recovered clock signal is a QCLK signal.

14. The electronic device of claim 10, wherein the first signal is a QCLK_LEFT_EDGE signal.

15. The electronic device of claim 10, wherein the second signal is a QCLK_RIGHT_EDGE signal.

16. The electronic device of claim 10, wherein if the first logical value is "1" and the second logical value is "1," then the first delay value is increased.

17. The electronic device of claim 10, wherein if the first logical value is "0" and the second logical value is "0," then the first delay value is decreased.

18. One or more non-transitory computer-readable media comprising instructions that, upon execution by one or more processors of an electronic device, are to cause a clock interpolation system of the electronic device to:
  identify, based on a set of one or more received clock signals, a recovered clock signal, a first signal that is based on a beginning of a logical data eye that is related to the set of one or more received clock signals, and a second signal that is based on an end of the logical data eye;
  apply a first delay value to the first signal to generate a delayed first signal;
  identify a first logical value that is related to a value of the delayed first signal at a logical change of the recovered clock signal;
  apply the first delay value to the recovered clock signal to generate a delayed recovered clock signal;
  identify a second logical value that is related to a value of the delayed recovered clock signal at a logical change of the second signal; and
  change, based on the first logical value and the second logical value, the first delay value or a timing of the recovered clock signal.

19. The one or more non-transitory computer-readable media of claim 18, wherein the first signal is related to an earliest error-free value of the set of one or more received clock signals.

20. The one or more non-transitory computer-readable media of claim 18, wherein the second signal is related to a latest error-free value of the set of one or more received clock signals.

* * * * *